(12) United States Patent
Persson et al.

(10) Patent No.: US 12,032,506 B2
(45) Date of Patent: Jul. 9, 2024

(54) MULTI-PROCESSOR ARRANGEMENT WITH POINT OF SERIALIZATION FOR BROADCAST COMMUNICATIONS

(71) Applicant: Arm Limited, Cambridge (GB)

(72) Inventors: Erik Persson, Lund (SE); Graeme Leslie Ingram, Melbourn (GB); Rune Holm, Oslo (NO); John Wakefield Brothers, III, Calistoga, CA (US)

(73) Assignee: Arm Limited, Cambridge (GB)

( * ) Notice: Subject to any disclaimer, the term of this patent is extended or adjusted under 35 U.S.C. 154(b) by 1 day.

(21) Appl. No.: 17/709,280

(22) Filed: Mar. 30, 2022

(65) Prior Publication Data
US 2023/0315669 A1 Oct. 5, 2023

(51) Int. Cl.
*H04L 49/101* (2022.01)
*G06F 13/42* (2006.01)
*G06N 5/04* (2023.01)

(52) U.S. Cl.
CPC .............. *G06F 13/42* (2013.01); *G06N 5/04* (2013.01)

(58) Field of Classification Search
CPC .............................. G06F 13/42; H04L 49/101
See application file for complete search history.

(56) References Cited

U.S. PATENT DOCUMENTS

| 4,975,909 A | 12/1990 | Masson et al. |
| 8,135,024 B2 * | 3/2012 | Abel ....................... H04L 47/58 370/413 |
| 9,373,438 B1 | 6/2016 | Ikriannikov et al. |
| 11,520,717 B1 | 12/2022 | Clarke et al. |
| 2008/0018359 A1 | 1/2008 | Schmit et al. |
| 2008/0040739 A1 | 2/2008 | Ketchum et al. |
| 2013/0294458 A1 | 11/2013 | Yamaguchi et al. |
| 2013/0322459 A1 | 12/2013 | Xu |
| 2015/0178435 A1 | 6/2015 | Kumar |
| 2017/0295111 A1 * | 10/2017 | Sadowski ............ G06F 15/7825 |
| 2018/0279389 A1 | 9/2018 | Kwag et al. |
| 2019/0069238 A1 | 2/2019 | Choi et al. |
| 2019/0205746 A1 | 7/2019 | Nurvitadhi et al. |

OTHER PUBLICATIONS

Search Report under Section 17(5), App. No. GB2304043.9, dated Aug. 11, 2023, 5 pages.
Malumbres, et al, "An efficient implementation of tree-basked multicast routing for distributed shared-memory multiprocessors," Journal of Systems Architecture 46 (2000), accepted Jan. 16, 2000, pp. 1019-1032.
Bolotin, et al, "QNoC: QOS architecture and design process for network on chip," Journal of Systems Architecture vol. 50, Issues 2-3, Feb. 2004, available online Oct. 23, 2003, pp. 105-128.
Office Action, U.S. Appl. No. 17/709,255, Mailed Apr. 6, 2023, 22 pages.
Response to Office Action, U.S. Appl. No. 17/709,255, filed Jul. 5, 2023, 28 pages.

(Continued)

*Primary Examiner* — David E Martinez
(74) *Attorney, Agent, or Firm* — Berkeley Law & Technology Group, LLP

(57) ABSTRACT

The present disclosure relates generally to multi-processor arrangements and, more particularly, to a point of serialization for broadcast communications within multi-processor arrangements.

12 Claims, 10 Drawing Sheets

(56) References Cited

OTHER PUBLICATIONS

Notice of Allowance, U.S. Appl. No. 17/709,255, Mailed Aug. 8, 2023, 15 pages.
Issue Fee, U.S. Appl. No. 17/709,255, filed Nov. 8, 2023, 6 pages.
Office Action, U.S. Appl. No. 17/709,293, Mailed Aug. 10, 2023, 5 pages.
Response to Office Action, U.S. Appl. No. 17/709,293, filed Nov. 7, 2023, 12 pages.

* cited by examiner

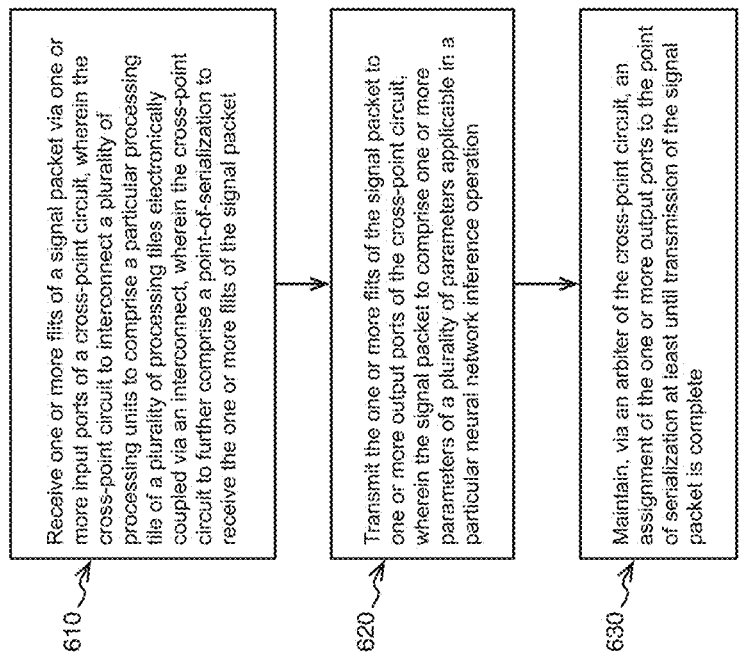

MULTI-PROCESSOR ARRANGEMENT WITH POINT OF SERIALIZATION FOR BROADCAST COMMUNICATIONS

BACKGROUND

Field

The present disclosure relates generally to multi-processor arrangements and, more particularly, to a point of serialization for broadcast communications within multi-processor arrangements.

Information

Integrated circuit devices, such as processors, for example, may be found in a wide range of electronic device types. Computing devices, for example, may include integrated circuit devices, such as processors, to process signals and/or states representative of diverse content types for a variety of purposes. With an abundance of diverse content being accessible, signal and/or state processing techniques continue to evolve. Some computing devices, for example, may incorporate multiple processors at least partially coupled together via an interconnect. In some circumstances, implementing electronic interconnects may pose challenges related to, for example, routing, deadlocks, latencies, congestion, etc.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 6 is a flow diagram depicting an embodiment of a process for serializing a broadcast signal packet within an example cross-point circuit;

Figure 1:
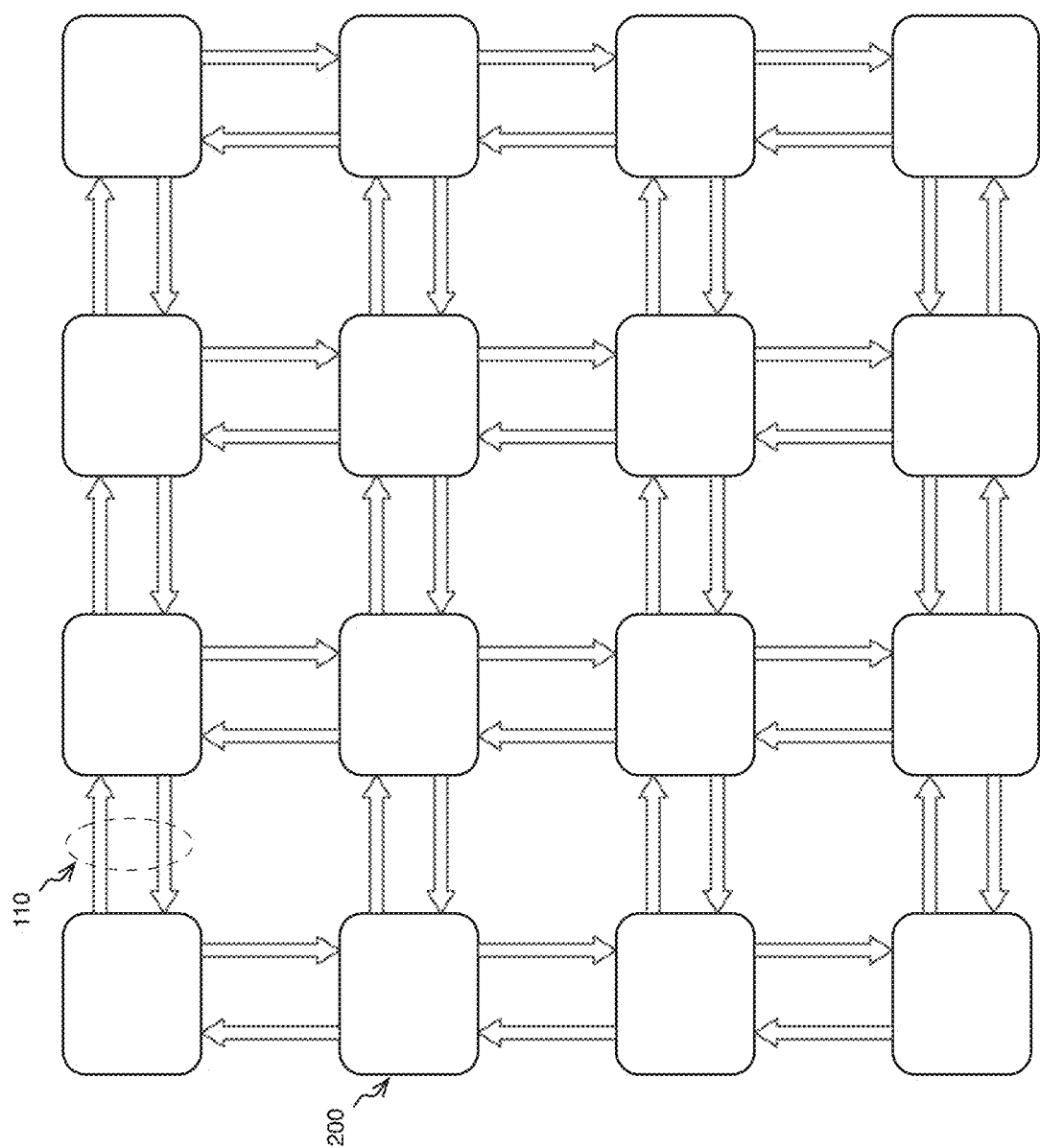
FIG. 1 is a schematic block diagram depicting an embodiment of a multi-processor arrangement including a plurality of processing tiles.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned above, integrated circuit devices, such as processors, for example, may be found in a wide range of electronic device types. Computing devices, for example, may include integrated circuit devices, such as processors, to process signals and/or states representative of diverse content types for a variety of purposes. With an abundance of diverse content being accessible, signal and/or state processing techniques continue to evolve. Some computing devices, for example, may incorporate multiple processors at least partially coupled together via an interconnect. In some circumstances, implementing electronic interconnects may pose challenges related to, for example, routing, deadlocks, latencies, congestion, etc.

For example, neural networks may find increasing utility in a range of applications including speech recognition, computing device vision applications (e.g., facial recognition, handwriting recognition, etc.), and/or natural language processing, to name but a few examples. Relatively large neural network models, for example, may utilize considerable memory storage space, memory interface bandwidth, and/or computing resources, for example. To perform neural network inference operations, for example, some computing devices may incorporate multiple processing units. As discussed more fully below, implementing multiple processing units within a computing device may pose particular challenges with respect to efficient transfer of signals and/or signal packets between and/or among processing units, for example.

FIG. 1 is a schematic block diagram depicting an embodiment 100 of a multi-processor arrangement. In implementations, multi-processor arrangements, such as arrangement 100, may include a plurality of processing tiles, such as processing tiles 200. "Processing tile" and/or the like refers to an arrangement comprising one or more processing units (e.g., one or more processor cores). For example, arrangement 100 may be referred to as a "multi-core processor." "Processing unit," "processor core" and/or the like may be utilized herein interchangeably. In an implementation, arrangement 100 may comprise a neural processing unit (NPU), although subject matter is not limited in scope in this respect. Further, in an implementation, NPU 100 may be implemented on a single semiconductor die, although, again, subject matter is not limited in scope in these respects.

For a multi-core processor, such as NPU 100, efficient transfer of signals and/or signal packets between and/or among the various processor cores and/or between processor cores and memory (e.g., memory external to the various processor cores) may be advantageous. In an implementation, the multi-processor arrangement of NPU 100 may comprise sixty-four processor cores, although subject matter is not limited in scope in this respect. In an implementation, NPU 100 may comprise sixteen processing tiles 200. Further, for example, individual processing tiles 200 may include four processor cores (see, for example, FIG. 2, discussed below). For implementations that include relatively larger numbers of processor cores, an electronic interconnect may not directly couple individual processor cores to all other processor cores. Rather, for example, NPU 100 may comprise a mesh arrangement as depicted in FIG. 1. As shown in FIG. 1, in an implementation, individual processing tiles 200 of the mesh arrangement of NPU 100 may be coupled to adjacent processing tiles 200 via an electronic interconnect 110, as discussed more fully below.

Figure 2:
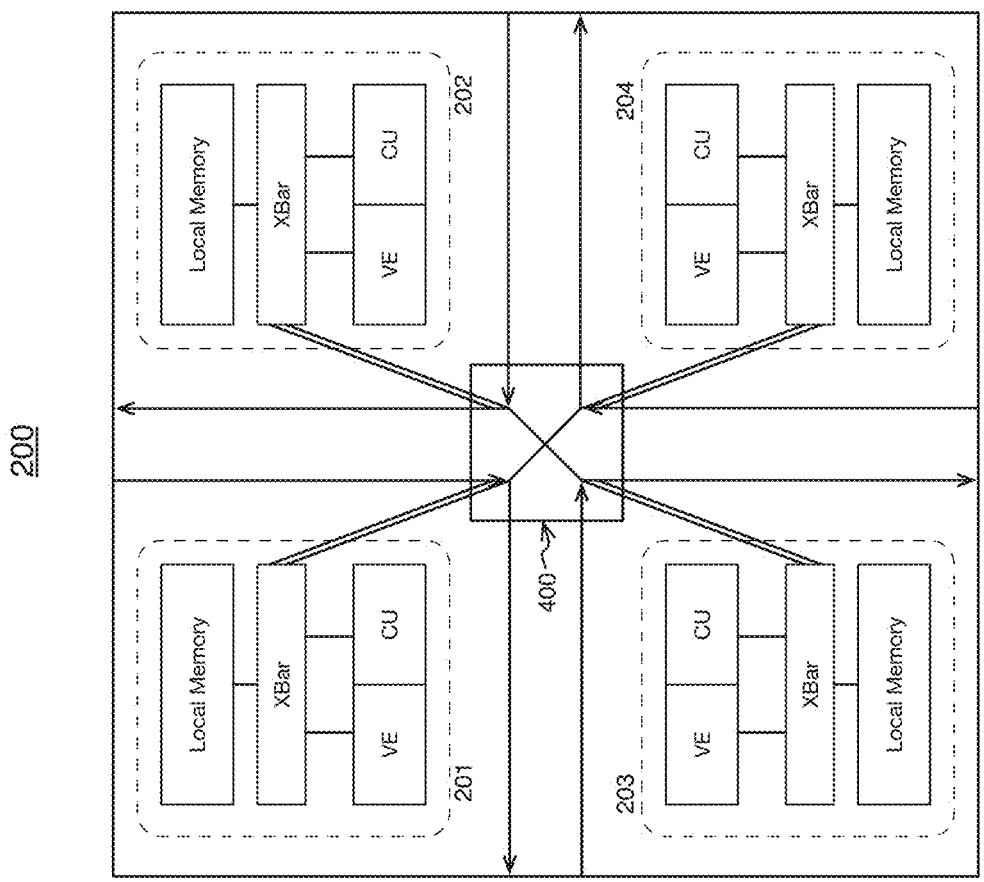
FIG. 2 is a schematic block diagram depicting an embodiment of a processing tile.

FIG. 2 is a schematic block diagram depicting an embodiment of a processing tile, such as processing tile 200. As mentioned, in an implementation, a processing tile may include one or more processor cores. For example, processor tile 200 may comprise processor cores 201, 202, 203 and/or 204. In an implementation, individual processor cores, such as processor core 201, may include one or more execution units, such as a vector execution unit (VE) and/or a convolution unit (CU). Also, in an implementation, individual processor cores, such as processor core 201, may include a local memory (e.g., local shared buffer). Various memories and/or execution units with individual processor cores may be at least partially coupled via an interconnect, such as a crossbar (XBar) interconnect, for example. Although processor cores 201-204 are depicted as comprising particular execution units, interconnects and/or memories, for example, a wide range of arrangements, configurations, etc. are possible in a variety of implementations.

In implementations, for applications involving neural networks, for example, multiple processing tiles (e.g., all processing tiles) and/or multiple processor cores (e.g., all cores) within NPU 100 may participate in performing a particular neural network inference operation. Further, a neural network layer may be split spatially over various processing tiles 200 and/or processor cores. For example, feature map traffic may be relatively spatial in character and, in an implementation, neural network inference operations may be scheduled such that parts of an input feature map may be shared between physically adjacent processor cores and/or physically adjacent processing tiles. In an implementation, utilization of a mesh arrangement, such as the example mesh arrangement of NPU 100, may lead to efficient power and/or bandwidth utilization for spatially-scheduled operations.

However, in some circumstances, signal packet traffic in a multi-processor arrangement, such as NPU 100, for example, may be more global than spatial in character and/or may be scheduled to be shared among multiple processing tiles. For example, parameters, such as neural network weight parameters, may be obtained from a memory, such as an external (e.g., external to the mesh arrangement of NPU 100) dynamic random access memory (DRAM) and/or the parameters may be transmitted to multiple processing tiles, such as processing tiles 200. Also, for example, parameters, such as neural network weight parameters, may be obtained from multiple processor tiles 200 and/or the obtained parameters may be transmitted to multiple processor tiles 200. Further, feature map parameters, for example, may be obtained from an external memory and/or from one or more local memories (e.g., memories local to one or more individual processor cores of one or more processing tiles 200) and the obtained feature map parameters may be transmitted to a plurality of processing tiles 200. Of course, these are merely examples of transmission types and/or parameter types that may involve multiple processing tiles 200, and subject matter is not limited in scope in these respects.

In some circumstances, multi-processor arrangements, such as the mesh arrangement of NPU 100, may pose challenges with respect to deadlocks as signal packets are communicated between and/or among processing tiles, such as processing tiles 200. For example, if arbitrary signal packet traffic is allowed within a multi-processor arrangement such as NPU 100, circular dependencies may arise that may result in signal packet traffic becoming stuck.

To address such challenges, interconnect 110 of NPU 100, for example, may include an example transport protocol comprising a link layer and a memory access layer. In an implementation, a link layer may include a channel having separate request (REQ) and response (RSP) virtual channels utilizing the same physical wiring. In an implementation, interconnect 110 may comprise a plurality of wires interconnecting the various processing tiles 200 and each of the plurality of wires of interconnect 110 may be shared by both REQ and RSP virtual channels. For example, REQ and RSP virtual channels may conduct respective logical streams that may flow independently so that backpressure in one stream does not block the other. By keeping REQ and RSP signal packets on separate virtual channels, REQ signal packets may not stall RSP signal packets and/or RSP signal packets may not stall REQ signal packets, for example. In an implementation, separate register slices within respective cross-point circuits 400 for individual processing tiles 200 may be utilized for respective REQ and RSP virtual channels so that communications in one of the virtual channels can continue in circumstances where the other of the virtual channels is stalled.

In an implementation, a transport protocol may be customized to more closely align with particular characteristics of a particular multi-processor arrangement, such as the mesh arrangement of NPU 100. For example, a design of a transport protocol may be based at least in part on an area of a mesh arrangement. In an implementation, an area of a mesh arrangement may be proportional to a number of physical wires in an interconnect, such as interconnect 110, for example. However, subject matter is not limited in scope in these respects.

Tables 1 and 2, below, depict an example physical layer arrangement for an interconnect, such as interconnect 110, for example. Table 1 shows an example signaling protocol for interconnect 110 from the perspective of a transmitter and Table 2 shows the signaling protocol from the perspective of a receiver.

TABLE 1

Transmitter signaling

| Signal | Bit Width | Direction | Description |
|---|---|---|---|
| tx_valid | 1 | Out | 1 = valid payload |
| tx_vchan | 1 | Out | Virtual channel identifier<br>0 = Request channel (REQ)<br>1 = Response channel (RSP) |
| tx_data | data_w | Out | Subdivided into header and payload, belongs to virtual channel specified by tx_chan |
| tx_last | 1 | Out | 1 = last flit of signal packet |
| tx_ready | 2 | In | tx_valid and tx_ready[tx_vchan] = 1 indicates flit transfer is complete. tx_valid, tx_ready[tx_chan] and tx_last all = 1 indicates packet transfer complete |

TABLE 2

Receiver signaling

| Signal | Bit Width | Direction | Description |
|---|---|---|---|
| rx_valid | 1 | In | 1 = valid payload |
| rx_vchan | 1 | In | Virtual channel identifier<br>0 = Request channel (REQ)<br>1 = Response channel (RSP) |
| rx_data | data_w | In | Subdivided into header and payload, belongs to virtual channel specified by tx_chan |
| rx_last | 1 | In | 1 = last flit of signal packet |
| rx_ready | 2 | Out | rx_valid and rx_ready[rx_vchan] = 1 indicates flit transfer is complete. rx_valid, rx_ready[rx_chan] and rx_last all = 1 indicates packet transfer complete |

As may be seen from Tables 1 and 2, an example signaling protocol for interconnect 110 may include a valid/ready handshake protocol. For example, a binary value "1" on signal rx_valid/tx_valid may indicate a valid payload. Further, for example, for the two-bit rx_ready/tx_ready field, a value "1" on the tx_valid/rx_valid signal and a value of "1" on the rx_ready[rx_vchan]/tx_read[tx_vchan] signal may indicate that a flit transfer has completed (flits and/or packets are described more fully below). Further, for example, signals rx_valid, rx_ready[rx_vchan] and rx_last at a receiving device all having values of "1" may indicate that a packet transfer has completed.

Although examples described herein may include a valid/ready handshake protocol for an interconnect, such as interconnect 110, subject matter is not limited in scope in these respects. For example, in implementations, a link "credit" system may be implemented to arbitrate transmission resources for an interconnect, such as interconnect 110. For example, for transmission of flits (again, flits and/or packets are described more fully below) from a first cross-point circuit 300 of a first particular processing tile 200 to a second particular cross-point circuit 300 of a second particular processing tile 200, the second cross-point circuit of the second processing tile (e.g., downstream device) may communicate back to the first cross-point circuit of the first processing tile (e.g., upstream device) one or more signals and/or states representative of an amount of vacancies in an input buffer of the second cross-point circuit of the second processing tile. Further, in an implementation, the first cross-point circuit of the first processing tile (e.g., upstream device) may transmit one or more flits to the second cross-point circuit of the second processing tile (e.g., downstream device) responsive to an indication of sufficient vacancy in the input buffer of the second cross-point circuit of the second processing tile. Again, subject matter is not limited in scope in these respects.

As mentioned, a link layer may include virtual channels REQ and RSP, in an implementation. Also, in an implementation, a pair of REQ and RSP virtual channels may collectively form a unidirectional link between a transmitter and a receiver. Interconnect 110, for example, may comprise a first unidirectional link including a first pair of virtual channels REQ and RSP. In an implementation, a first unidirectional link may be oriented in a first direction. Further, in an implementation, interconnect 110 may comprise a second unidirectional link including a second pair of virtual channels REQ and RSP, wherein the second unidirectional link is oriented in a second direction.

Further, in an implementation, a memory access layer for the present example transport protocol may include read request (AR), write request (W), read response (R) and/or write response (B) signal packet types, although subject matter is not limited in scope in these respects. In an implementation, a read request packet may comprise a length of approximately seventy bits, for example. A read response packet may have a length of approximately two-hundred seventy, in an implementation. Further, for example, a write request signal packet may comprise approximately 300 bits and a write response signal packet may have a length of approximately 25 bits. Of course, these are merely example signal packet types and/or lengths and subject matter is not limited in scope in these respects.

Example signal packet fields may include, for example, a destination node identifier (DNID). In an implementation, a particular specified value for the DNID field may indicate a broadcast signal packet, for example. Also, in an implementation, example signal packet fields may include a source node identifier (SNID) and/or a transaction identifier (TRID), for example.

In an implementation, example signal packet fields may include a packet type field, wherein a value of "0" indicates a read request or response and/or a value of "1" indicates a write request or response. Additionally, for example, whether a signal packet comprises a request or response may be inferred from the particular virtual channel involved (e.g., separate REQ and RSP virtual channels). Additionally, in an implementation, a signal packet may include an address field, a length field, one or more payload fields and/or a "last" bit. Of course, these are merely examples of the types of bits, fields, values, etc. that may make up a signal packet and subject matter is not limited in scope in these respects.

In an implementation, signal packets may be partitioned into smaller units of uniform size referred to as "flits." In an implementation, a signal packet may comprise at least a header portion and a payload portion, although claimed subject matter is not limited in scope in this respect. Also, in an implementation, header and/or payload portions of a signal packet may be partitioned into one or more flits. A "header" flit may comprise a first flit overall of a particular signal packet and/or may include at least a chunk of a header portion of a particular signal packet. For example, a header flit may include one or more signals and/or states indicative of a destination for a particular communication such that a cross-point circuit, such as cross-point circuit 400, may determine an appropriate output port for a particular signal packet, for example.

In an implementation, measures to avoid deadlock conditions within a multi-processor arrangement, such as the mesh arrangement of NPU 100, for example, may include particular rules for routing signal packets through cross-point circuits 400 of respective processing tiles 200. For example, vertical-first or horizontal-first rules for the routing of signal packets may be implemented. In an implementation, priority for signal packet routing as the signal packet traverses individual cross-point circuits 400 may be given to either a vertical or horizontal dimension. For example, a signal packet may first travel along a prioritized dimension then along the other dimension as it advances towards a destination. Further, for horizontal-first routing, a signal packet may be communicated between a source processing tile 200 and destination processing tile 200 by first traversing interconnect 110 in a horizontal direction and then in a vertical direction (e.g., if needed to reach the intended destination). Vertical-first and/or horizontal-first routing priorities may be established via programming of one or more configuration registers within respective cross-point circuits 400 for the various processing tiles 200, in an implementation.

The above-discussed example techniques for avoiding deadlock conditions within a multi-processor arrangement, such as the example mesh arrangement of NPU 100, may be effective for unicast communication (e.g., single transmission source, single destination) of signal packets. However, in some circumstances, it may be advantageous to employ broadcast communications within a multi-processor arrangement, such as NPU 100.

For example, multi-processor arrangement performance may tend to be limited by parameter (e.g., weight parameter) read bandwidth in some circumstances. For example, in some circumstances, parameters (e.g., weight parameters) may be stored in local memories within one or more processing tiles 200 and/or such parameters may be retrieved from the various local memories so that NPU 100 can perform neural network inference operations. In other circumstances, neural network parameters may be stored in one or more external memories (e.g., memories external to the mesh arrangement of NPU 100). Again, such parameters may be retrieved from one or more external memories so that NPU 100 can perform neural network inference operations. Also, in some circumstances, a number of processing tiles and/or processor cores may be scheduled to receive the same parameters. Further, in some circumstances, parameters may be retrieved from multiple processing tiles and/or processor cores and may be to be distributed to the multiple processing tiles and/or processor cores may be located in multiple processing tiles and/or processor cores (e.g., uniformed shared communication). For at least these reasons, broadcast communications within a multi-processor arrangement (e.g., NPU 100), for example, may provide efficiency and/or performance advantages in some circumstances. However, the example techniques discussed above for avoiding deadlock conditions may, by themselves, be insufficient for broadcast communications in some circumstances.

"Broadcast communication" in this context refers to communication of signals and/or signal packets (e.g., parameters, including feature map parameters, weight parameters, etc.) obtained from one or more sources (e.g., one or more memories and/or one or more processing tiles 200) and distributed to multiple destinations (e.g., multiple processing tiles 200). Similarly, "broadcast signal packet" refers to a signal packet representative of one or more values, parameters (e.g., weight parameters), states, etc. to be communicated between one or more sources (e.g., one or memories and/or one or more processing tiles 200) and a plurality of destinations (e.g., multiple processing tiles 200).

To help address the challenge of avoiding deadlock conditions for broadcast communication of signal packets within the mesh arrangement of NPU 100, for example, a particular processing tile of the plurality of processing tiles 200 may be designated as a broadcast hub. "Broadcast hub" and/or the like refers to a particular processing tile of a plurality of processing tiles through which all broadcast signal packets for a particular multi-processor arrangement flow. In an implementation, a broadcast signal packet may be communicated from one or more processing tiles 200 to a designated broadcast hub. Also, in an implementation, the broadcast hub may subsequently initiate transmission of the broadcast signal packet to a plurality of processing tiles 200 other than the broadcast hub. In an implementation, a particular processing tile of the plurality of processing tiles 200 may be designated as a broadcast hub by programming one or more registers within the particular processing tile, for example. In implementations, any of processing tiles 200 may be designated as a broadcast hub.

Figure 3:
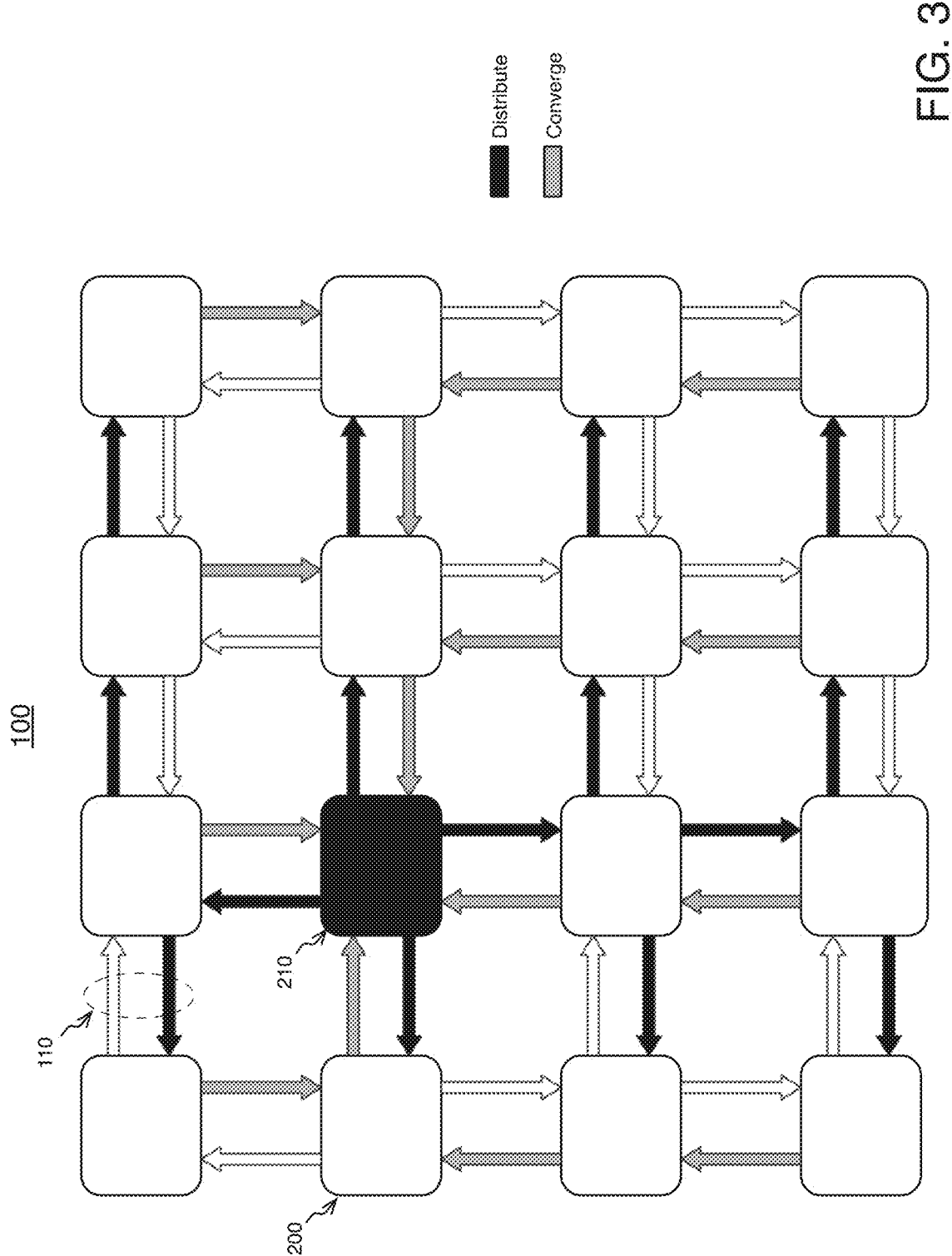
FIG. 3 is a schematic block diagram depicting an example routing of an example broadcast signal packet within a multi-processing tile arrangement.

FIG. 3 is a schematic block diagram depicting an example routing of an example broadcast signal packet within a multi-processor arrangement, such as the example mesh arrangement of NPU 100. As depicted, in an implementation, broadcast communication involving a broadcast hub may involve a converge phase and a distribute phase. For example, during a converge phase, broadcast signal packets may converge on a particular processing tile 210 designated as a broadcast hub. In a distribute phase, broadcast packets may be distributed across the mesh arrangement of NPU 100 via interconnect 110, for example. In an implementation, converging and/or distributed broadcast signal packets may be routed on a vertical-first or horizontal-first basis. Because the converging signal packets and the distributed signal packets may utilize different resources (e.g., links, routes, pathways, etc.) of the mesh arrangement of NPU 100, deadlock conditions may be avoided.

Figure 4:
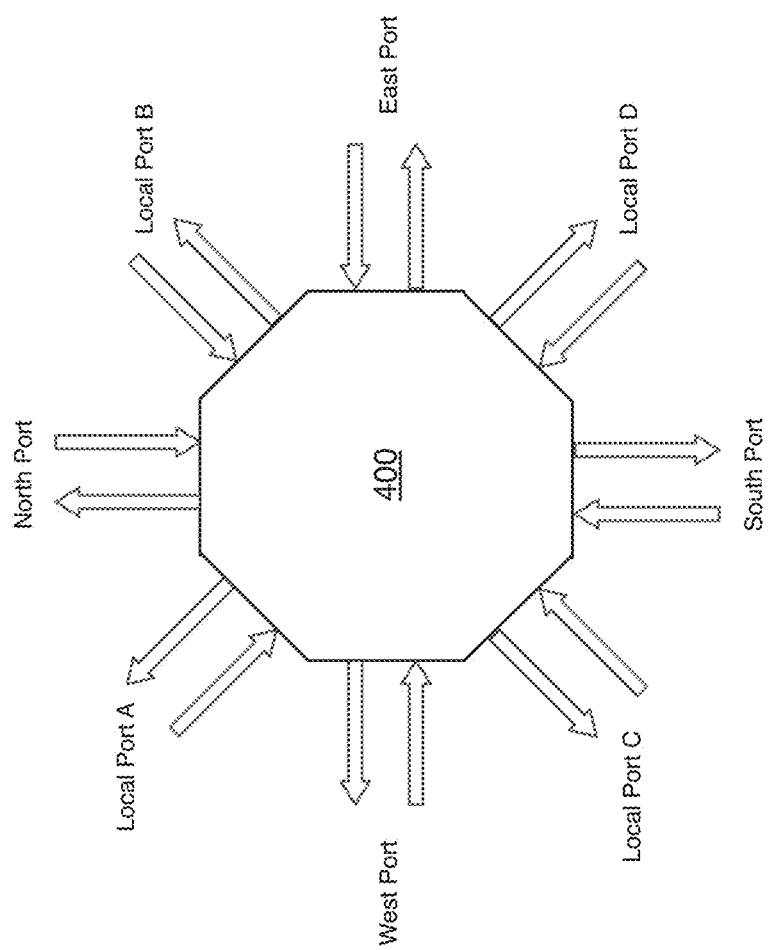
FIG. 4 is a schematic block diagram depicting an embodiment of a cross-point circuit for an example processing tile.

FIG. 4 depicts an embodiment 400 of an example cross-point circuit. As depicted in FIG. 2, individual processing units 200 may comprise multiple (e.g., four) processor cores interconnected by way of cross-point circuit 400, in an implementation. Cross-point circuit 400 may also facilitate communication between adjacent processing tiles 200, for example.

In an implementation, cross-point circuit 400 may comprise one or more ports (e.g., four ports) coupled to one or more (e.g., four) processor cores. For example, a local port A of cross-point circuit 400 may facilitate communication with processor core 201, a local port B may facilitate communication with processor core 202, a local port C may facilitate communication with processor core 203 and/or a local port D may facilitate communication with processor core 204. Further, for example, cross-point circuit 400 may include multiple (e.g., four) ports to facilitate communication with multiple (e.g., four) adjacent processing tiles. In an implementation, cross-point circuit 400 may include north, south, east and/or west ports to facilitate communication with one or more adjacent processing tiles. In an implementation, cross-point circuits 400 within individual processing tiles 200 may communicate with adjacent processing tiles 200 via interconnect 110.

Figure 5A:
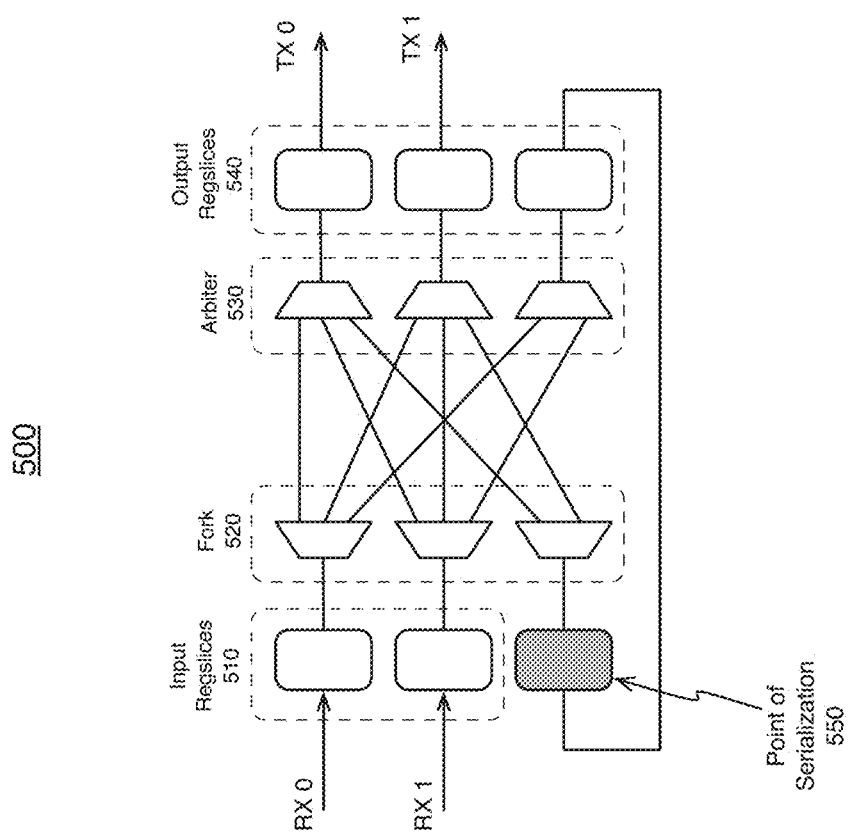
FIG. 5a is a schematic block diagram depicting an embodiment of a point of serialization.
Figure 5B:
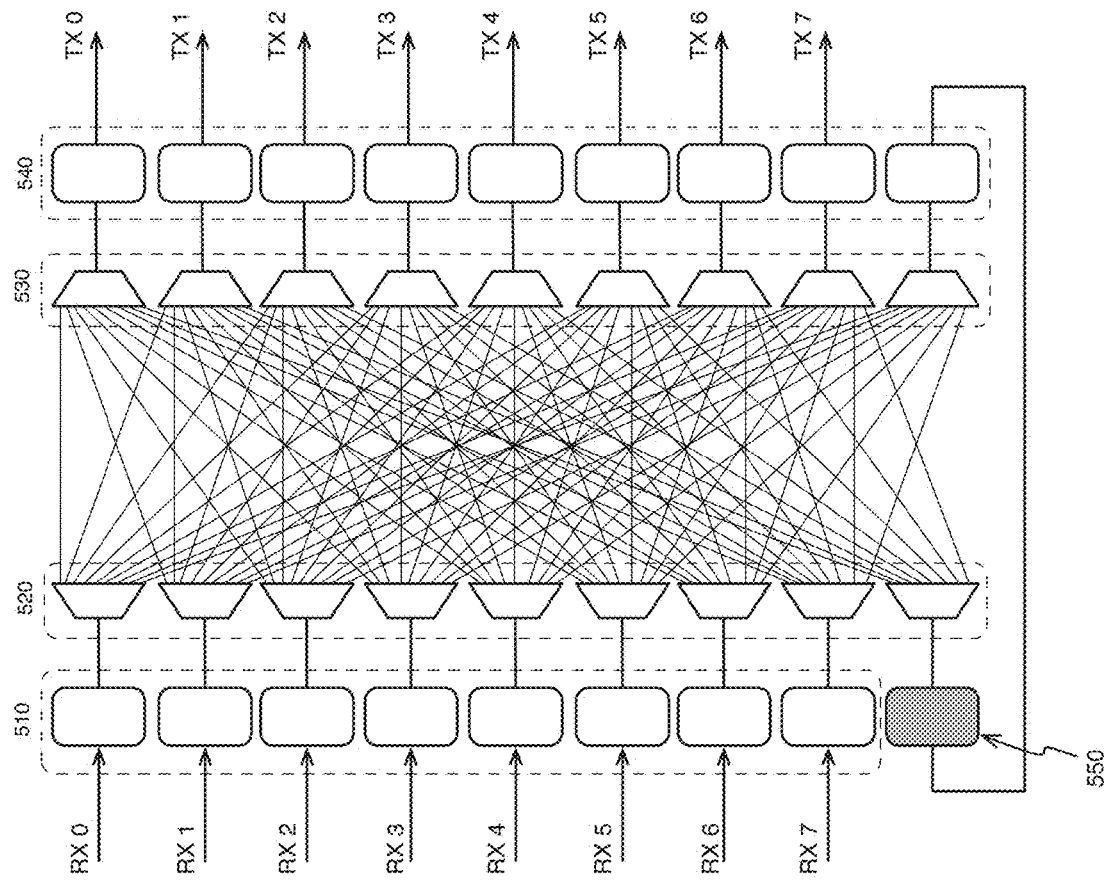
FIG. 5b is a schematic block diagram depicting an embodiment of a point of serialization.

FIGS. 5a and 5b are schematic block diagrams of embodiments 500 and/or 501 of example point-of-serialization circuits. In implementations, cross-point circuit 400, for example, may incorporate a point of serialization. "Point of serialization," "point-of-serialization circuit" and/or the like in this context refers to a circuit through which broadcast signal packets received at one or more input ports of a cross-point circuit are routed. In implementations, a point-of-serialization circuit, such as point-of-serialization circuit 500 and/or 501, may prevent, at least in part, deadlock conditions within cross-point circuit 400. In an implementation, point-of-serialization circuit 500 and/or 501 may include input register slices 510, fork circuits 520, an arbiter circuit 530, output register slices 540 and/or a point-of-serialization register slice 550, for example. "Fork circuit" and/or the like refers to circuitry to steer signals, signal packets, flits, etc. For example, a fork circuit 520 may steer flits from one or more input port register slices 510 to point-of-serialization register slice 550.

For illustrative purposes, example point-of-serialization circuit 500 of FIG. 5a shows two input ports RX0 and RX1. Example point-of-serialization circuit 501 of FIG. 5b shows eight input ports RX0-RX7. However, implementations may include other numbers of input ports. For example, as discussed above, cross-point circuit 400 may include eight input and/or output ports, including east, west, north and/or south ports to facilitate communication with adjacent processing tiles, for example, and may also include local ports A, B, C and/or D for facilitating communication with processor cores 201-204. In an implementation, point-of-serialization circuit 501 may include eight input ports which may, for example, correspond to eight input register slices 510. Similarly, in an implementation, point-of-serialization circuit 501 may include eight output ports which may, for example, correspond to eight output register slices 540. Fork circuitry 520 and/or arbiter 530 may also be scaled to accommodate other numbers of input and/or output ports, in an implementation.

In implementations, because a cross-point circuit, such as cross-point circuit 400, may receive broadcast signal packets from multiple sources and/or may transmit broadcast signal packets to multiple destinations, circular dependencies may develop. For example, an arbiter may mutually lock up two forks and may maintain the arbitration status throughout transmission of the particular broadcast signal packet.

In an implementation, to help avoid deadlock conditions within a cross-point circuit, such as cross-point circuit 400, broadcast signal packets received at one or more input register slices 510 (e.g., all broadcast signal packets received at any input register slices) may be routed through a point of serialization, such as point-of-serialization register slice 550. Also, in an implementation, arbiter 530 may assign the particular broadcast signal packet to one or more particular output register slices 540. Further, for example, once transmission of a particular broadcast signal packet has begun with respect to the cross-point circuit, arbiter 530 may not switch output ports for the particular broadcast signal packet throughout transmission of the particular broadcast signal packet. In this manner, for example, broadcast signal packet traffic may be serialized and no two broadcast serial packets will become deadlocked within cross-point circuit 400. In implementations, routing signal packets through point-of-serialization circuitry, such as point-of-serialization register slice 550, may add a relatively minor amount of latency to signal packet communications while providing the significant benefit of preventing deadlock conditions.

As mentioned, signal packets may be partitioned into multiple flits, in an implementation. Also, for example, a header for a signal packet may be included in a first flit and may not be included in remaining flits. In an implementation, a signal packet, such as a broadcast signal packet, may be conveyed through cross-point circuit 400, for example, over multiple clock cycles on the same link. Also, in an implementation, to avoid deadlock conditions, all of the flits for an incoming signal packet may be routed through point-of-serialization register slice 550 and arbiter 530 may assign the signal packet to one or more particular output register slices 540. Further, arbiter 530 may maintain the allocation of the particular signal packet to the particular output register slice(s) 540 until the last flit of the particular signal packet has passed through the particular output register slice(s), for example. Once the last flit of the particular signal packet has passed through point-of-serialization register slice 550 and has passed through the output register slice(s) 540, arbiter 530 may then allocate the particular output register slice(s) to a subsequent signal packet. In other words, an arbiter, such as arbiter 530, may not switch output ports for a particular signal packet while remaining flits of that particular signal packet have not yet completed transmission through cross-point circuit 400.

In an implementation, a serialized signal packet may be broadcast from all output ports. For example, arbiter 530 may allocate a particular broadcast signal packet to all output register slices 540. Further, arbiter 530 may maintain the allocation of the particular broadcast signal packet to all output register slices 540 until all flits of the broadcast signal packet have been transmitted.

Further, in an implementation, because cross-point circuit 400 and/or point-of-serialization circuit 500 supports multi-flit packets, there may be no need to buffer entire packets. Rather, for example, it may be sufficient to buffer one or more flits of a signal packet. Input register slices 510 may store one or more signal packet flits, for example.

In an implementation, for circumstances in which a broadcast signal packet is to be transmitted to a particular output port, point-of-serialization circuit 500 may be bypassed. Similarly, point-of-serialization circuit 500 may be bypassed for unicast signal packets, for example.

In implementations, point-of-serialization circuits and/or techniques may be utilized in conjunction with other deadlock avoidance approaches including, for example, vertical-first and/or horizontal-first routing approaches, broadcast hub approaches, etc.

FIG. 6 is a flow diagram depicting an embodiment 600 of a process for serializing a signal packet within an example cross-point circuit, such as cross-point circuit 400. In a particular implementation, process 600 may include operations that may be performed in conjunction with example multi-processor arrangement 100, for example, and/or in conjunction with NPU 100, for example. It should be noted that content acquired or produced, such as, for example, input signals, output signals, operations, results, etc. associated with example process 600 may be represented via one or more digital signals and/or signal packets. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

As depicted at block 610, one or more flits of a signal packet may be received via one or more input ports of cross-point circuit 400, wherein cross-point circuit 400 to interconnect a plurality of processing units to comprise a particular processing tile of a plurality of processing tiles 200 electronically coupled via interconnect 110, wherein cross-point circuit 400 to further comprise a point-of-serialization, such as point-of-serialization register slice 550, to receive the one or more flits of the signal packet.

Further, in an implementation, the one or more flits of the signal packet may be transmitted to one or more output ports of cross-point circuit 400, wherein the signal packet to comprise one or more parameters of a plurality of parameters applicable in a particular neural network inference operation, as depicted at block 620. Additionally, as depicted at block 630, example process 600 may include maintaining, via arbiter 530 of cross-point circuit 400, an assignment of the one or more output ports of cross-point circuit 400 to a point of serialization, such as point-of-serialization register slice 550, at least until transmission of the signal packet is complete, for example.

In an implementation, for example process 600, a particular processing tile of the plurality of processing tiles 200 may comprise a broadcast hub, such as broadcast hub 210. Further, for example, example process 600 may also include, via broadcast hub 210, obtaining the plurality of parameters applicable in the particular neural network inference operation from one or more signal packets received from one or more processing tiles of the plurality of processing tiles 200, and initiating distribution of the obtained plurality of parameters to the plurality of processing tiles 200 other than broadcast hub 210.

In an implementation, for example process 600, the plurality of processing units may individually comprise neural processor units. Additionally, for example, the plurality of processing tiles 200 may comprise a mesh arrangement, such as mesh arrangement 100. Further, for example process 600, the signal packet may comprise a broadcast signal packet to be obtained from broadcast hub 210.

Also, for example process 600, the one or more input ports of cross-point circuit 400 may comprise one or more input port register slices 510. Further, the one or more output ports of cross-point circuit 400 may comprise one or more output port register slices 540, in an implementation.

As mentioned, a point-of-serialization may comprise a point-of-serialization register slice, such as point-of-serialization register slice 550. Additionally, for example, point-of-serialization register slice 550 may receive the one or more flits of the broadcast signal packet from one or more input port register slices 510. Also, in an implementation, arbiter 530 of cross-point circuit 400 may direct transmission of the one or more flits of the broadcast signal packet from point-of-serialization register slice 550 to one or more output port register slices 540. Further, in an implementation, for example process 600, interconnect 110 may comprise a first virtual channel for request operations and a second virtual channel for response operations.

Additionally, in an implementation, cross-point circuit 400 may comprise an asymmetrical cross-point circuit to include a greater number of electronically conductive elements and/or switch circuits dedicated to response operations than are dedicated to request operations. For example, an interconnect, such as interconnect 110, may include additional resources, such as additional links, directed towards improving external memory read bandwidth, in an implementation.

Further, in an implementation, a signal packet may comprise a broadcast signal packet or a unicast signal packet to be transmitted to a particular output port. In an implementation, example process 600 may include transmitting the one or more flits of the broadcast signal packet or the unicast signal packet to the particular output port while bypassing the point-of serialization circuit.

Figure 7:
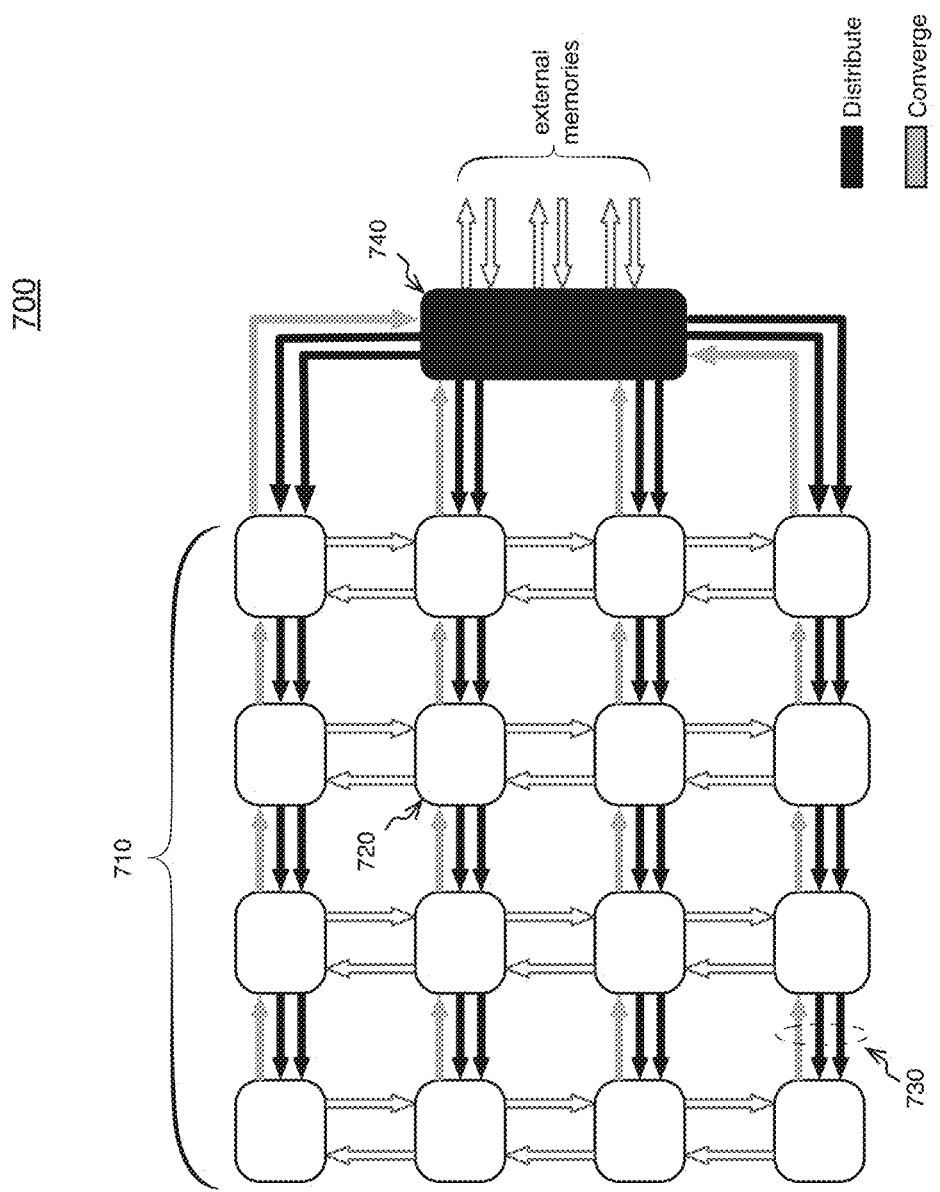
FIG. 7 is a schematic block diagram depicting an embodiment of an asymmetrical mesh arrangement with a broadcast hub external to the mesh arrangement.

For example, FIG. 7 is a schematic block diagram depicting an embodiment 700 of an NPU. In an implementation, NPU 700 may include an example mesh arrangement 910 and a data flow control (DFC) 740 to facilitate access to one or more external memories. In an implementation, DFC may also comprise a broadcast hub, for example. In an implementation, mesh arrangement 710 may comprise a plurality of processing tiles 720 and/or may further include an asymmetrical interconnect 730. In an implementation, processing tiles 720 may share at least some characteristics with processing tiles 200 discussed above. For example, processing tiles 720 may include one or more processing units (e.g., processor cores) and/or may include a cross-point circuit, such as cross-point circuit 800, discussed below.

In an implementation, interconnect 730 may comprise asymmetrical links to improve external memory read bandwidth, for example. In an implementation, interconnect 970 may comprise one link flowing towards DFC 740 from mesh arrangement 710 and/or may further comprise two links flowing away from DFC 740 towards mesh arrangement 710, for example.

In an implementation, by increasing the number of links flowing from DFC 740 to mesh arrangement 710 as compared with the number of links flowing towards DFC 740 from mesh arrangement 710, for example, significant improvements in terms of external memory access bandwidth and/or in terms of broadcast signal packet bandwidth may be realized. In an implementation, because neural network inference operations may include significantly more external memory read operations than external memory write operations, an increase in memory read bandwidth may have a substantial positive impact on NPU performance and/or efficiency. Similarly, due at least in part to asymmetrical characteristics of interconnect 730, a significant improvement in performance and/or efficiency may be realized for broadcast communications.

In an implementation, DFC 740 may comprise switching circuitry to facilitate signal packet communication between processing tiles 720 of mesh arrangement 710 and one or more external memories. Further, in an implementation, DFC 740 may be utilized along with interconnect 730 to provide advantages with respect to deadlock avoidance and/or with respect to efficient distribution of broadcast signal packets, for example.

Figure 8:
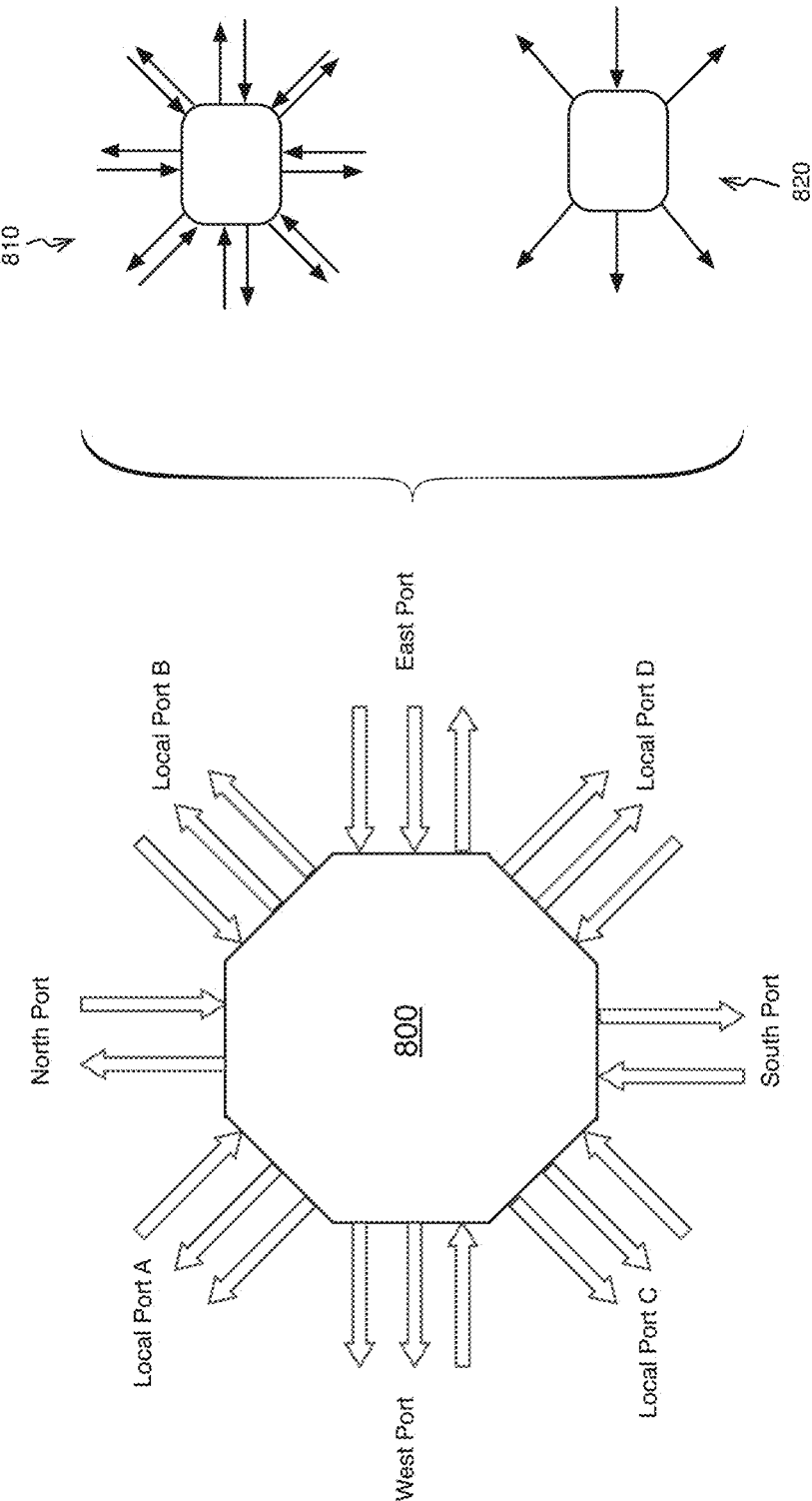
FIG. 8 is a schematic block diagram depicting an embodiment of an asymmetrical cross-point circuit.

FIG. 8 is a schematic block diagram depicting an embodiment 800 of an asymmetrical cross-point circuit. In implementations, asymmetrical cross-point circuit 800 may be incorporated into processing tiles 720, for example, to help implement asymmetrical interconnect 730. In an implementation, asymmetrical cross-point circuit 800 may comprise a primary crossbar circuit 810 and may further comprise a secondary crossbar circuit 820. In an implementation, a combination of primary crossbar circuit 810 and secondary crossbar circuit 820 may yield cross-point circuit 800.

In an implementation, cross-point circuit 800 may comprise asymmetrical properties for an east port and a west port for signal packet flow in an east-west horizontal orientation, in an implementation. Also, in an implementation, local port A, local port B, local port C and/or local port D may facilitate asymmetrical signal packet flow to the respective processor cores for processing tiles 920, for example.

In an implementation, primary crossbar circuit 810 may comprise an 8×8 crossbar having eight unilateral links flowing into crossbar circuit 810 and also having eight links flowing away from crossbar circuit 810. As mentioned above, in an implementation, individual links may comprise virtual links REQ and RSP. In an implementation, pairs of opposite-orientation links may be provided for the respective north, east, south and/or west ports as well as for local ports A, B, C and/or D. Also, in an implementation, secondary crossbar circuit 820 may comprise a 1×5 crossbar circuit having a single unilateral link flowing into secondary crossbar circuit 820 and five unilateral links flowing away from secondary crossbar circuit 820.

Further, in an implementation, a combination of the 8×8 primary crossbar circuit 810 and the 1×5 secondary crossbar circuit 820 may yield 9×13 cross-point circuit 800 having nine links flowing into cross-point circuit 800 and thirteen unilateral links flowing away from cross-point circuit 800. Of course, subject matter is not limited in scope to the specific numbers and/or types of links mentioned in connection with the various example implementations described herein.

In an implementation, asymmetrical cross-point circuit 800 may comprise a point-of-serialization circuit, such as point-of-serialization circuit 500, that may include appropriate numbers of input ports and/or output ports sufficient to accommodate the various links flowing towards and/or away from cross-point circuit 800. For example, in an implementation, point-of-serialization circuit 500 may include nine input register slices 510 and/or may include thirteen output register slices. Thus, in particular implementations, point-of-serialization circuitry, such as point-of-serialization circuit 500 including point-of-serialization register slice 550, for example, may be scaled as appropriate to accommodate asymmetrical interconnect 730 and/or asymmetrical cross-point circuit 800, for example. As mentioned, by routing broadcast signal packets received at one or more input register slices 510 through point-of-serialization register slice 550, for example, deadlock conditions for broadcast signal packets within a cross-point circuit, such as asymmetrical cross-point circuit 800, and therefore asymmetrical interconnect 730, may be avoided.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

According to an embodiment, multi-processor arrangements 100 and/or 700, processing tile 200, cross-point circuits 300 and/or 800, and/or point-of-serialization circuits 500 and/or 501, for example, may be formed by and/or expressed in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 9:
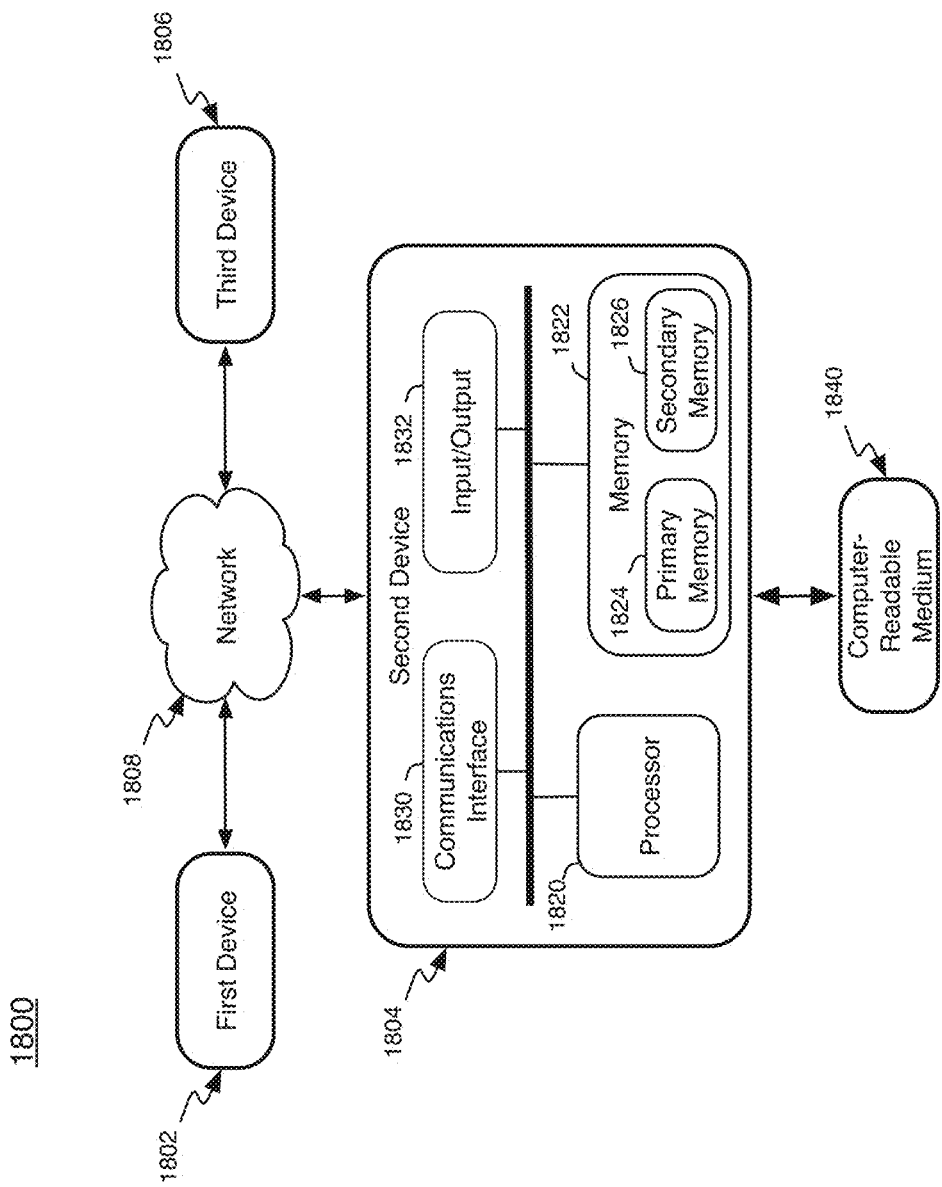
FIG. 9 is a schematic diagram illustrating an embodiment of an example computing device.

In one example embodiment, as shown in FIG. 9, a system embodiment may comprise a local network (e.g., device 1804 and medium 1840) and/or another type of network, such as a computing and/or communications network. For purposes of illustration, therefore, FIG. 9 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 9 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-8 and in the text associated at least with the foregoing figure(s) of the present patent application.

Referring now to FIG. 9, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 9, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, sensor content, etc. in the form of signals and/or states. Thus, a computing device, in the context of the present patent application, may comprise hardware, software, firmware, or any combination thereof (other than software per se). Computing device 1804, as depicted in FIG. 18, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, endpoint and/or sensor nodes, gateway devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, sensor content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 9, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 9 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 9, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 9 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An apparatus, comprising:
   a cross-point circuit to comprise a point-of-serialization circuit to receive a plurality of flits of a signal packet via a plurality of input ports of the cross-point circuit and to serially transmit the plurality of flits of the signal packet to one or more output ports;
   and wherein the one or more output ports to remain assigned to the point-of-serialization circuit via an arbiter of the cross-point circuit until transmission of the signal packet is complete.

2. The apparatus of claim 1, wherein the point-of-serialization circuit to receive the plurality of flits of the signal packet from the plurality of input ports via a plurality of fork circuits.

3. The apparatus of claim 1, further comprising:
   a plurality of processing tiles, wherein individual processing tiles to comprise a plurality of processing units interconnected via individual cross-point circuits; and
   an interconnect to electronically couple individual processing tiles of the plurality of processing tiles to two or more other processing tiles of the plurality of processing tiles;
   wherein a particular processing tile of the plurality of processing tiles to comprise a broadcast hub to:
   obtain a plurality of parameters applicable in a particular operation from one or more signal packets received from one or more processing tiles of the plurality of processing tiles; and
   initiate distribution of the obtained plurality of parameters to the plurality of processing tiles other than the broadcast hub.

4. The apparatus of claim 3, wherein the plurality of processing units to individually comprise neural processor units and wherein the particular operation to comprise a particular neural network inference operation.

5. The apparatus of claim 3, wherein the plurality of processing tiles to comprise a mesh arrangement.

6. The apparatus of claim 3, wherein the one or more signal packets received from the one or more processing tiles of the plurality of processing tiles to comprise a broadcast signal packet to be obtained from the broadcast hub.

7. The apparatus of claim 6, wherein the plurality of input ports of the cross-point circuit to comprise a plurality of input port register slices, wherein the one or more output ports of the cross-point circuit to comprise one or more output port register slices, and wherein the point-of-serialization circuit to comprise a point-of-serialization register slice.

8. The apparatus of claim 7, wherein the point-of-serialization register slice to receive the plurality of flits of the broadcast signal packet from the plurality of input port register slices and wherein the arbiter of the cross-point circuit to direct transmission of the plurality of flits of the broadcast signal packet from the point-of-serialization register slice to the one or more output port register slices.

9. The apparatus of claim 3, wherein the interconnect to comprise a first virtual channel for request operations and a second virtual channel for response operations, and wherein the individual cross-point circuits to comprise asymmetrical cross-point circuits to include a greater number of electronically conductive elements and/or switch circuits dedicated to response operations than to be dedicated to request operations.

10. The apparatus of claim 1, wherein the signal packet to comprise one or more parameters applicable in a particular operation.

11. The apparatus of claim 1, wherein the signal packet to comprise a broadcast signal packet, and wherein the point-of-serialization circuit to receive the plurality of flits of the broadcast signal packet via the plurality of input ports of the cross-point circuit and to serially transmit the plurality of flits of the broadcast signal packet to a plurality of output ports of the cross-point circuit.

12. The apparatus of claim 1, wherein the cross-point circuit to receive an additional signal packet to comprise a broadcast signal packet or a unicast signal packet, wherein the additional signal packet to be transmitted to a particular output port of the one or more output ports, and wherein, to transmit the additional signal packet to the particular output port, the cross-point circuit to bypass the point-of-serialization circuit.

* * * * *